(12) United States Patent
Fukumura et al.

(10) Patent No.: US 7,752,378 B2
(45) Date of Patent: Jul. 6, 2010

(54) PARTITION PRIORITY CONTROLLING SYSTEM AND METHOD

(75) Inventors: Hiromi Fukumura, Kawasaki (JP); Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/200,247

(22) Filed: Aug. 28, 2008

(65) Prior Publication Data
US 2008/0320272 A1 Dec. 25, 2008

Related U.S. Application Data

(63) Continuation of application No. PCT/JP2006/303805, filed on Feb. 28, 2006.

(51) Int. Cl.
*G06F 13/00* (2006.01)
*H05K 7/10* (2006.01)
(52) U.S. Cl. .................................. 710/317; 710/301
(58) Field of Classification Search ................ 710/8, 710/10, 14, 301–302, 104, 107, 316–317, 710/240; 712/13
See application file for complete search history.

(56) References Cited

U.S. PATENT DOCUMENTS 4,843,541 A * 6/1989 Bean et al. .................... 710/36

6,910,108 B2 * 6/2005 Downer et al. ............... 711/141
2006/0020769 A1 1/2006 Herrell et al.

FOREIGN PATENT DOCUMENTS

| JP | 2005-122229 | 5/2005 |
|---|---|---|
| JP | 2006-40275 | 2/2006 |

OTHER PUBLICATIONS

Szymanski, Ted H. et al. On the Permutation Capabilty of Multistage Interconnection Networks. IEEE Transactions on Computers. Vol. C-36, No. 7. Jul. 1987. pp. 810-822.*
International Search Report for PCT/JP2006/303805, mailed Jun. 6, 2006.

* cited by examiner

*Primary Examiner*—Thomas J Cleary
(74) *Attorney, Agent, or Firm*—Staas & Halsey LLP

(57) ABSTRACT

A partition priority controlling apparatus includes a partition ID identifying unit, a partition ID match detecting unit for detecting whether or not a partition to which one of a plurality of system board modules belongs matches partitions to which the other system board modules respectively belong for at least one combination of the system board modules, and an inter-crossbar-unit conflict partition detecting unit for detecting a combination of partitions, which make a conflict between two of a plurality of crossbar units, for at least one combination of the two crossbar units on the basis of the determination result of the partition ID identifying unit, and the detection result of the partition ID match detecting unit.

10 Claims, 8 Drawing Sheets

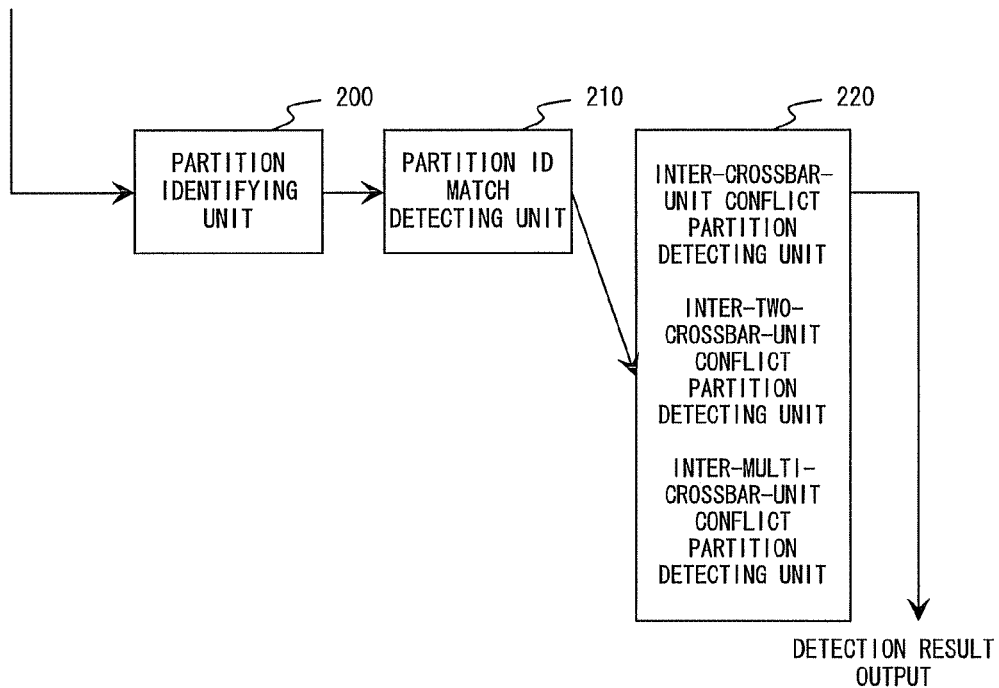
F I G. 2

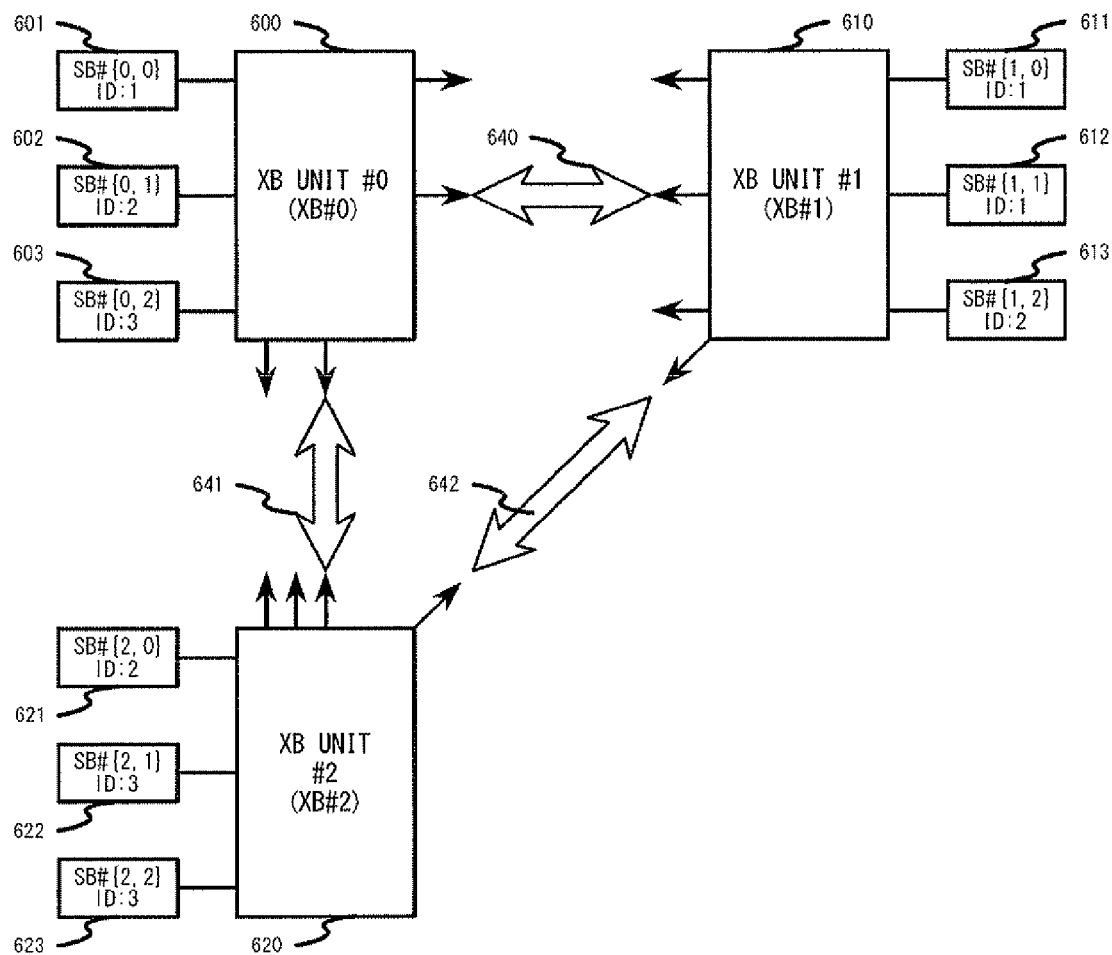
F I G. 6

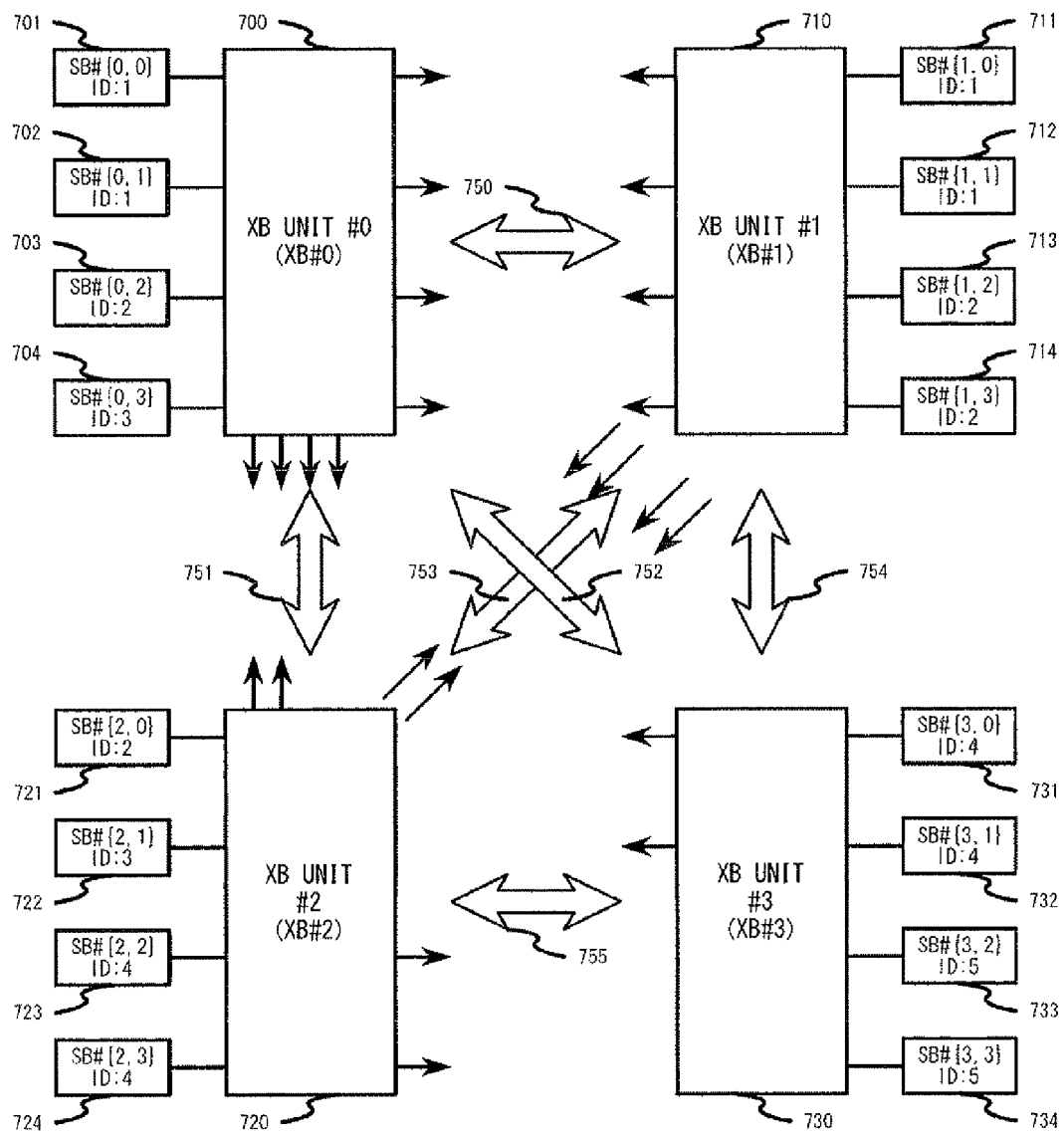
F I G. 7

PARTITION PRIORITY CONTROLLING SYSTEM AND METHOD

CROSS REFERENCE TO RELATED APPLICATION

This application is a continuation of PCT application of PCT/JP2006/303805, which was filed on Feb. 28, 2006.

BACKGROUND OF THE INVENTION

1. Field of the Invention

An aspect of the present invention relates to a computer system allowing to configure a partition, and may be applied to a crossbar module for transmitting information with packets by interconnecting system board modules.

2. Description of the Related Art

In a large-scale server system, resources of one server computer, such as CPUs or memories, may be divided into a plurality of groups (hereinafter referred to as partitions). Each of the partitions can independently activate or deactivate its system, and is regarded as one totally independent server machine which can operate its corresponding system. To simultaneously transmit, or broadcast in other words, information within each partition, its simultaneous transmission range is only partition-wide, and one partition does not exert an influence on an operation of another partition.

Especially, there are cases where a plurality of system board modules (i.e., one type of system expansion unit modules each equipped with a CPU, a memory, and so forth; hereinafter abbreviated to SBs) are respectively divided into a plurality of partitions, crossbar module units (hereinafter abbreviated to XB units) respectively interconnect and manage some of the system board modules, and packets are broadcast. In these cases, the XB units are interconnected via bus devices. Each of the partitions may belong to a single XB unit, and sometimes may belong to a plurality of XB units. Therefore, if a partition extends across a plurality of XB units, information must be broadcast to the partition using an inter-XB-unit bus device. However, it is normally difficult to secure an inter-XB unit bus device as a resource for each partition due to bottlenecks in terms of cost, etc. Accordingly, there arises the need for a technique for identifying and controlling partitions in conflict when using an inter-XB-unit bus device.

Conventionally, the conflict priorities of all of partitions (uniquely determined by a system configuration) that may use the above described inter-XB-unit bus device are fixedly controlled (i.e., fixed conflict priority method).

With the above described fixed conflict priority method according to conventional technology, a partition that does not use an inter-XB-unit bus device is also involved in calculating the conflict priorities. This leads to a problem such that the use rate of inter-XB-unit bus devices falls. There has been also the demand for a technique able to implement a system that saves the cost of inter-XB-unit bus devices by eliminating the need for securing an inter-XB-unit bus device as a resource for each partition, and does not reduce the performance extremely.

SUMMARY OF THE INVENTION

Embodiments of the present invention provides a partition priority controlling apparatus for controlling the priorities of a plurality of partitions using a bus device in a computer system, the computer system including a plurality of system board modules grouped into the plurality of partitions, a plurality of crossbar units, and the bus device for interconnecting a combination of two of the plurality of crossbar units, to each of which at least one of the plurality of system board modules is connected, and the partition priority controlling apparatus including:

a partition ID identifying unit for determining to which partition each of the plurality of system board modules belongs;

a partition ID match detecting unit, which is connected to the partition ID identifying unit, for detecting whether or not a partition to which one of the plurality of system board modules belongs matches partitions, to which the other system board modules respectively belong, for at least one combination of the plurality of system board modules on the basis of the determination result of the partition ID identifying unit; and an inter-crossbar-unit conflict partition detecting unit, which is connected to the partition ID match detecting unit, for detecting a combination of partitions causing a conflict between two of the plurality of crossbar units, for at least one combination of the two crossbar units on the basis of the determination result of the partition ID identifying unit and the detection result of the partition ID match detecting unit.

Another embodiments of the present invention provides a method for controlling the priorities of a plurality of partitions using a bus device in a computer system including a plurality of system board modules grouped into the plurality of partitions, a plurality of crossbar units, and the bus device for interconnecting a combination of two of the plurality of crossbar units, each of the crossbar units includes and manages at least one of the plurality of system board modules, and the method including:

determining, by a partition ID identifying unit, to which partition each of the plurality of system board modules belongs;

detecting, by a partition ID match detecting unit, whether or not a partition to which one of the plurality of system board modules belongs matches with partitions to which the other system board modules respectively belong, for at least one combination of the plurality of system board modules on the basis of the determination result of the partition ID identifying unit;

when a first crossbar unit to which the plurality of system board modules are connected exists among the plurality of crossbar units, an inter-two-crossbar-unit direct conflict partition detecting unit determining that a combination of two system board modules, which are determined not to belong to the same partition on the basis of the determination result of the partition ID identifying unit, causes a direct conflict under the condition that:

if each of the two system board modules belongs to a partition of a system board module connected to a second crossbar unit different from the first crossbar unit, for at least one combination of the two system board modules among the system board modules connected to the first crossbar unit; and when a third crossbar unit to which the three or more system board modules are connected exists among the plurality of crossbar units, an inter-multi-crossbar-unit indirect conflict partition detecting unit determining that a combination of at least three system board modules, which are determined not to belong to the same partition on the basis of the determination result of the partition ID identifying unit, causes an indirect conflict under the condition that:

if the inter-two-crossbar-unit direct conflict partition detecting unit determines that one of two system board modules among the at least three system board modules causes a direct conflict with the other of the two system board modules via a fourth crossbar unit for at least one combination of the at least three system board modules, and if the inter-two-crossbar-unit direct conflict partition detecting unit determines that at least one of the two system board modules among the at least three system board modules causes a direct conflict with any of the at least three system board modules except for the two system board modules via a fifth crossbar unit different from the fourth crossbar unit for at least one combination of the at least three system board modules.

Using the partition priority controlling apparatus and method according to embodiments of the present invention can implement a system that can improve the use rate of XB unit bus devices, and does not degrade the performance to the extreme while saving the cost required for the XB-unit bus devices.

BRIEF DESCRIPTION OF THE DRAWINGS

FIG. 2 is a block diagram showing the configuration of an apparatus according to an embodiment of the present invention;

FIG. 6 is a schematic diagram for explaining a configuration of a first embodiment according to the present invention;

FIG. 7 is a schematic diagram for explaining a configuration of a second embodiment according to the present invention.

DESCRIPTION OF THE PREFERRED EMBODIMENTS

Partition priority controlling apparatuses according to preferred embodiments of the present invention are described in detail below with reference to the drawings. However, the present invention is not limited to these preferred embodiments. In the following description, an SB connected to an XB unit is sometimes referred to as "an SB belonging to an XB". Similarly, an SB grouped as a partition is sometimes referred to as "an SB belonging to a partition". An XB unit assigned with a number s is abbreviated to "XB#s". An SB that belongs to XB#s and is assigned with a number t is abbreviated to "SB#{s,t}". An inter-XB-unit bus device that connects XB#s and XB#u is sometimes abbreviated to BUS#{s_u}. A partition assigned with an ID of w is sometimes abbreviated to "PAR#w." It is noted that the characters s, t, u, and w used here are intended for illustrative purposes, and conditions of actually used numbers are to be understood pursuant to the description provided later.

Figure 1:
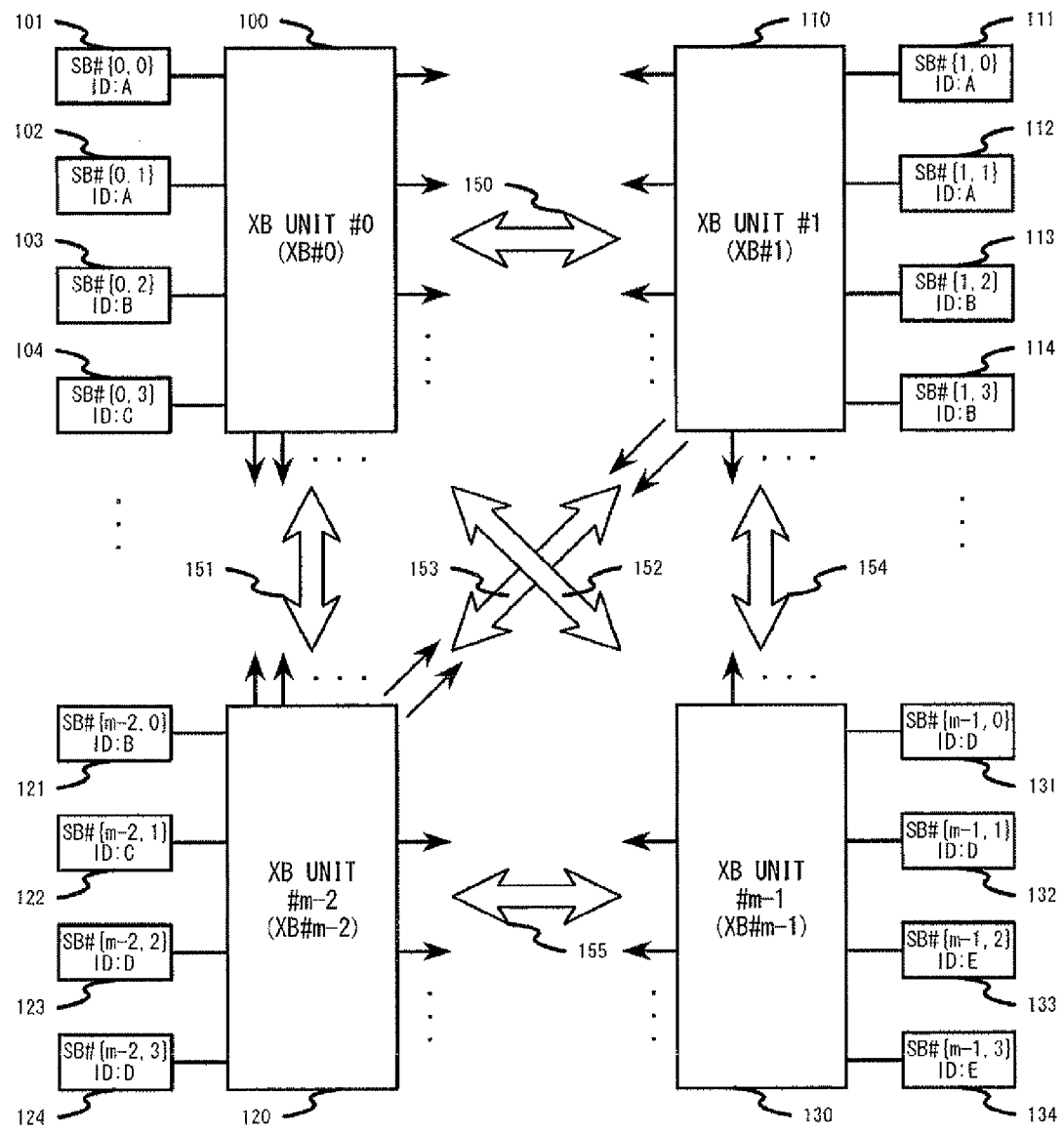
FIG. 1 is a schematic diagram showing a partition configuration for explaining a principle of an embodiment of the present invention.

FIG. 1 is a schematic diagram for explaining a partition configuration recognition mechanism in a first embodiment according to the present invention. In FIG. 1, m XB units and n SBs (m and n are natural numbers) exist as a general example. For convenience of illustration, m is assumed to, but not limited to, be four or more in FIG. 1. The XB units are respectively referred to as XB#0, XB#1, . . . , XB#m-1. To the k-th XB unit XB#k (k is a natural number, and $1 \leq k \leq m$), f(k) SBs are connected. Here, $$\sum_{k=1}^{m} f(k) = n.$$

For ease of explanation, it is assumed here that $_mC_2$ inter-XB-unit bus devices in total connect combinations of each of the XB units and all of the other XB units without repetitions. However, the present invention is not limited to this implementation.

FIG. 1 depicts an XB unit#0 100, an XB unit#1 110, an XB unit#m-2 120, and an XB unit#m-1 130 as representative XB units. Hollow arrows in FIG. 1 respectively indicate inter-crossbar-unit bus devices 150, 151, 152, 153, 154, and 155. The number of the inter-crossbar-unit bus devices in FIG. 1 is intended for convenience of illustration and merely an example, and the present invention is not limited to this number. Moreover, each of the XB units shown in FIG. 1 are respectively connected to a plurality of SBs. As exemplified in FIG. 1, SB#{0,0} 101, SB#{0,1} 102, SB#{0,2} 103, and SB#{0,3} 104, and further SBs not shown are connected to the XB unit#0 100, and the total number of the SBs connected to XB unit#0 100 is f(0). For the numerals within the braces, which indicate the number of an SB, the first numeral is the number of an XB unit to which the SB is connected, and is an integer that is equal to or larger than 0 and equal to or smaller than m; and the second number is the number sequentially assigned to the SB connected to the XB unit, and is an integer that is equal to or larger than 0 and equal to or smaller than f(k). The same applies to the other XB units 110, 120, and 130. These SBs are grouped into p partitions (p is a natural number) assigned, for example, with IDs A, B, C, D, E, . . . in FIG. 1. For the sake of convenience, FIG. 1 only depicts the partition IDs A to E. However, the present invention is not limited to these partition IDs. Moreover, black solid arrows in FIG. 1 represent the existences of the other SBs that conflict with the SB over the use of an inter-XB-unit bus. A mechanism for detecting such conflict will be described in detail later.

FIG. 2 is a schematic diagram showing the configuration of a partition priority controlling apparatus according to an embodiment of the present invention. The apparatus according to an embodiment of the present invention includes a partition ID identifying unit 200, a partition ID match detecting unit 210, and an inter-crossbar-unit conflict partition detecting unit 220. The apparatus according to an embodiment of the present invention is connected to a system having a configuration similar to that shown in FIG. 1. Specifically, the partition priority controlling apparatus according to an embodiment of the present invention is provided within each XB unit.

The partition ID identifying unit 200 identifies the ID of a partition to which each SB belongs, in the above described system configuration.

The partition ID match detecting unit 210 can detect whether or not the ID of a partition to which an SB belongs, matches the ID of a partition to which another SB belongs, by using a partition ID matching table upon receipt of the identification results of the partition ID identifying unit 200 for example.

Table 1 shows an example of the partition ID matching table. Table 1 is the example of only part of a table showing matches between the IDs of the SBs belonging to the XB unit#0 when four SBs are connected to each XB unit.

TABLE 1

```
XB0_SB0_ID = XB0_SB0_ID → XB00_SB00_ID_MCH ↑
           = XB0_SB1_ID → XB00_SB01_ID_MCH or → XB00_SB0_ID_MCH
           = XB0_SB2_ID → XB00_SB02_ID_MCH |
           = XB0_SB3_ID → XB00_SB03_ID_MCH ↓
           = XB1_SB0_ID → XB01_SB00_ID_MCH ↑
           = XB1_SB1_ID → XB01_SB01_ID_MCH or → XB01_SB0_ID_MCH
           = XB1_SB2_ID → XB01_SB02_ID_MCH |
           = XB1_SB3_ID → XB01_SB03_ID_MCH ↓
           = XB2_SB0_ID → XB02_SB00_ID_MCH ↑
           = XB2_SB1_ID → XB02_SB01_ID_MCH or → XB02_SB0_ID_MCH
           = XB2_SB2_ID → XB02_SB02_ID_MCH |
           = XB2_SB3_ID → XB02_SB03_ID_MCH ↓
           = XB3_SB0_ID → XB03_SB00_ID_MCH ↑
           = XB3_SB1_ID → XB03_SB01_ID_MCH or → XB03_SB0_ID_MCH
           = XB3_SB2_ID → XB03_SB02_ID_MCH |
           = XB3_SB3_ID → XB03_SB03_ID_MCH ↓
XB0_SB1_ID = XB0_SB0_ID → XB00_SB10_ID_MCH ↑
           = XB0_SB1_ID → XB00_SB11_ID_MCH or → XB00_SB1_ID_MCH
           = XB0_SB2_ID → XB00_SB12_ID_MCH |
           = XB0_SB3_ID → XB00_SB13_ID_MCH ↓
           = XB1_SB0_ID → XB01_SB10_ID_MCH ↑
           = XB1_SB1_ID → XB01_SB11_ID_MCH or → XB01_SB1_ID_MCH
           = XB1_SB2_ID → XB01_SB12_ID_MCH |
           = XB1_SB3_ID → XB01_SB13_ID_MCH ↓
           = XB2_SB0_ID → XB02_SB10_ID_MCH ↑
           = XB2_SB1_ID → XB02_SB11_ID_MCH or → XB02_SB1_ID_MCH
           = XB2_SB2_ID → XB02_SB12_ID_MCH |
           = XB2_SB3_ID → XB02_SB13_ID_MCH ↓
           = XB3_SB0_ID → XB03_SB10_ID_MCH ↑
           = XB3_SB1_ID → XB03_SB11_ID_MCH or → XB03_SB1_ID_MCH
           = XB3_SB2_ID → XB03_SB12_ID_MCH |
           = XB3_SB3_ID → XB03_SB13_ID_MCH ↓
XB0_SB2_ID = XB0_SB0_ID → XB00_SB20_ID_MCH ↑
           = XB0_SB1_ID → XB00_SB21_ID_MCH or → XB00_SB2_ID_MCH
           = XB0_SB2_ID → XB00_SB22_ID_MCH |
           = XB0_SB3_ID → XB00_SB23_ID_MCH ↓
           = XB1_SB0_ID → XB01_SB20_ID_MCH ↑
           = XB1_SB1_ID → XB01_SB21_ID_MCH or → XB01_SB2_ID_MCH
           = XB1_SB2_ID → XB01_SB22_ID_MCH |
           = XB1_SB3_ID → XB01_SB23_ID_MCH ↓
           = XB2_SB0_ID → XB02_SB20_ID_MCH ↑
           = XB2_SB1_ID → XB02_SB21_ID_MCH or → XB02_SB2_ID_MCH
           = XB2_SB2_ID → XB02_SB22_ID_MCH |
           = XB2_SB3_ID → XB02_SB23_ID_MCH ↓
           = XB3_SB0_ID → XB03_SB20_ID_MCH ↑
           = XB3_SB1_ID → XB03_SB21_ID_MCH or → XB03_SB2_ID_MCH
           = XB3_SB2_ID → XB03_SB22_ID_MCH |
           = XB3_SB3_ID → XB03_SB23_ID_MCH ↓
XB0_SB3_ID = XB0_SB0_ID → XB00_SB30_ID_MCH ↑
           = XB0_SB1_ID → XB00_SB31_ID_MCH or → XB00_SB3_ID_MCH
           = XB0_SB2_ID → XB00_SB32_ID_MCH |
           = XB0_SB3_ID → XB00_SB33_ID_MCH ↓
           = XB1_SB0_ID → XB01_SB30_ID_MCH ↑
           = XB1_SB1_ID → XB01_SB31_ID_MCH or → XB01_SB3_ID_MCH
           = XB1_SB2_ID → XB01_SB32_ID_MCH |
           = XB1_SB3_ID → XB01_SB33_ID_MCH ↓
           = XB2_SB0_ID → XB02_SB30_ID_MCH ↑
           = XB2_SB1_ID → XB02_SB31_ID_MCH or → XB02_SB3_ID_MCH
           = XB2_SB2_ID → XB02_SB32_ID_MCH |
           = XB2_SB3_ID → XB02_SB33_ID_MCH ↓
           = XB3_SB0_ID → XB03_SB30_ID_MCH ↑
           = XB3_SB1_ID → XB03_SB31_ID_MCH or → XB03_SB3_ID_MCH
           = XB3_SB2_ID → XB03_SB32_ID_MCH |
           = XB3_SB3_ID → XB03_SB33_ID_MCH ↓
```

Here, each row at the left of an arrow in the middle of Table 1 means a determination of whether or not a variable on the left side and a variable on the right side each linked by an equal sign are equal. For example, a variable XB0_SB0_ID on the left side of an equal sign stores a value indicating the ID of a partition to which SB#{0,0} belonging to XB#0 belongs. In the example shown in FIG. 1, XB0_SB0_ID has a value indicating A. In an embodiment, this value can be represented with arbitrary bits by using a method according to a known technique. Each row at the left side of the arrow in Table 1 means to determine whether or not a variable on the left side matches a variable on the right side that is similarly defined as the variable on the left side.

In the meantime, each row at the right of the arrow in the middle of Table 1 indicates a variable to be output as a detection result. For example, a variable XB00_SB00_ID_MCH on the left side is a variable that is true if the ID of the partition to which SB#{0,0} belonging to XB#0 belongs matches the ID of the partition to which SB#{0,0} belonging to XB#0 belongs. However, this variable must be true in this case because the comparison is made between the same partition.

In an example of using integers a, b, c, and d that are suitable for the above described condition, XBab_SBcd_ID_MCH is a variable that is true if the ID of a partition to which SB#{a,c} belonging to XB#a belongs matches the ID of a partition to which SB#{b,d} belonging to XB#b belongs. For example, a bit can be set to 1 if the result of detection is true, or set to 0 if the result of detection is false. The same applies to the following description. "or" enclosed by three arrows on the right side of Table 1 means that a corresponding variable on the right side of Table 1, XB00_SB0_ID_MCH in the topmost column in Table 1 for example, becomes true if at least one of four variables on the left side of Table 1, XB00_SB00_ID_MCH, XB00_SB01_ID_MCH, XB00_SB02_ID_MCH, and XB00_SB03_ID_MCH in the topmost column for example, is true. Namely, the variable XB00_SB0_ID_MCH on the right side of Table 1 is the variable that is determined true if the partition ID of SB#{0,0} belonging to XB#0 is the same as the partition ID of any of the SBs belonging to XB#0. However, this variable must be true in this case because the comparison is made between the same partition. In a general example of using integers a, b, and c that are suitable for the above described condition, XBab_SBc_ID_MCH is a variable that is determined true if the ID of a partition to which SB#{a,c} belonging to XB#a belongs matches with the ID of a partition to which any of SBs belonging to XB#b belongs.

The partition ID match detecting unit 210 can detect whether not a partition to which one of SBs belonging to an XB unit matches each of partitions to which the other SBs belong, by using the above described partition ID matching table for at least one combination of the SBs for example.

The inter-crossbar-unit conflict partition detecting unit 220 detects and determines a conflict between partitions over the use of an inter-XB-unit bus device. The reason why partitions make a conflict is that information must be simultaneously broadcast to all of SBs which configure a partition, with packets, etc. Its further details will be described later.

For example, conflicts between partitions over the use of an inter-XB-unit bus device can be classified into a "direct conflict" and an "indirect conflict".

Here, the "direct conflict" means that a plurality of partitions configured via a single inter-XB-unit bus exist, and make a conflict over the use of the single inter-XB-unit bus. In the example shown in FIG. 1, SB#{0,0} 101 assigned with the partition ID of A has the same partition ID as those of SB#{0,1} 102, SB#{1,0} 111, and SB#{1,1} 112. Since SB#{0,0} 101 and SB#{0,1} 102 among these SBs belong to the same XB unit, they are ignored here in order to avoid confusion in the explanation, although XB#0 and XB#0 are handled as a direct conflict when being processed. SB#{0,0} 101, SB#{1,0} 111, and SB#{1,1} 112 belong to the same partition as described above. Therefore, these SBs configure the partition via a bus device BUS#{0_1} 150 that connects XB#0 and XB#1. Additionally, SB#{0,2} 103 assigned with the partition ID of B has the same partition ID as those of SB#{1,2} 113, SB#{1,3} 114, and SB#{m-2,0} 121. Therefore, these SBs configure the partition via BUS#{0_1} 150 and BUS#{0_m-2} 151. Accordingly, PAR#A and PAR#B share BUS#{0,1} 150. Such sharing is determined as a direct conflict between PAR#A and PAR#B via BUS#{0_1} 150. This is represented with the above described variable expression, for example, as follows. ((XB01_SB0_ID_MCH·XB01_SB1_ID_MCH)+(XB02_SB0_ID_MCH·XB02_SB1_ID_MCH)+(XB03_SB0_ID_MCH·XB03_SB1_ID_MCH)). This is true if 1) SB#{0,0} and any of the SBs belonging to XB#1 belong to the same partition, and SB#{0,1} and any of the SBs belonging to XB#1 belong to the same partition, or if 2) SB#{0,0} and any of the SBs belonging to XB#2 belong to the same partition, and SB#{0,1} and any of the SBs belonging to XB#2 belong to the same partition, or if 3) SB#{0,0} and any of the SBs belonging to XB#3 belong to the same partition, and SB#{0,1} and any of the SBs belonging to XB#3 belong to the same partition. "+" and "·" in the expression respectively mean "OR" and "AND" in a logical expression. The same applies to the description provided below.

In the meantime, the "indirect conflict" indicates that two partitions make a conflict indirectly via any one or a plurality of XB units. This is more specifically described by taking FIG. 1 as an example. Originally, PAR#A and PAR#C are a combination that does not make a direct conflict. SB#{0,2} 103 which belongs to the partition PAR#B different from PAR#A to which SB#{0,0} 101 belongs and PAR#C to which SB#{0,3} 104 belongs, is connected to XB#0 100. PAR#B and PAR#A makes a direct conflict as stated earlier, and also PAR#B and PAR#C make a direct conflict. PAR#A and PAR#C are therefore proved to make an indirect conflict via PAR#B in such a case. More specifically, PAR#A and PAR#C are determined to make an indirect conflict via BUS#{0,1} 150 and BUS#{0_m-2} 151 because PAR#A and PAR#B make a direct conflict via BUS #{0_1} 150, and PAR#B and PAR#C make a direct conflict via BUS#{0_m-2} 151. This is represented with the above described variable expression as follows: (((XB01_SB0_ID_MCH·XB01_SB2_ID_MCH)+(XB02_SB0_ID_MCH·XB02_SB2_ID_MCH)+(XB03_SB0_ID_MCH·XB03_SB2_ID_MCH))·((XB01_SB3_ID_MCH·XB01_SB2_ID_MCH)+(XB02_SB3_ID_MCH·XB02_SB2_ID_MCH)+(XB03_SB3_ID_MCH·XB03_SB2_ID_MCH))). This is the expression that becomes true if SB#{0,0} and SB#{0,2} make a direct conflict via any of XB#1 to XB#3, and SB#{0,3} and SB#{0,2} make a direct conflict via any of XB#1 to XB#3. If this expression is true, this is referred to as the state where SB#{0,0} and SB#{0,3} make an indirect conflict via SB#{0,2}. Preferably, a similar determination is made for the other SBs belonging to SB#0. Furthermore, apparatuses and methods according to embodiments of the present invention can also detect and determine cases of an indirect conflict made via a plurality of SBs. This will be described in detail later.

Figure 3:
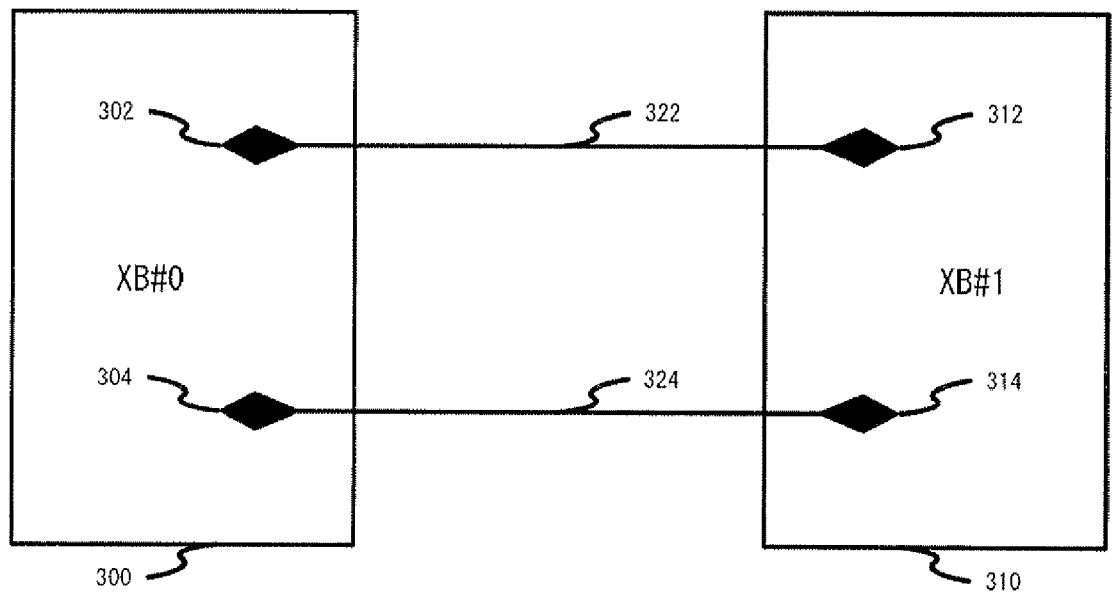
FIG. 3 is a conceptual diagram for explaining an example of a direct conflict that the apparatus according to an embodiment of the present invention can detect.

FIG. 3 is a conceptual diagram for further explaining the direct conflict. FIG. 3 exemplifies two XB units such as XB#0 300 and XB#1 310. In FIG. 3, two SBs, SB#{0,0} 302 and SB#{0,1} 304, are connected to XB#0 300, and also two SBs, SB#{1,0} 312 and SB#{1,1} 314, are connected to XB#1 310. In FIG. 3, the SBs are respectively depicted inside the XB units for ease of understanding. However, embodiments according to the present invention are not limited to this implementation. Also the number of SBs in FIG. 3 is merely an example, and embodiments according to the present invention are not limited to this number. In FIG. 3, SB#{0,0} 302 and SB#{1,0} 312 belong to the same partition PAR#A 322, and SB#{0,1} 304 and SB#{1,1} 314 belong to the same partition PAR#B 324 in a similar manner. PAR#A 322 and PAR#B 324 are considered to be different partitions here. Inter-XB-unit bus devices are omitted and not shown in FIG. 3.

In the configuration shown in FIG. 3, a direct conflict occurs between an operation for simultaneously broadcasting information to all of the SBs belonging to PAR#A 322, and an operation for simultaneously broadcasting information to all of the SBs belonging to PAR#B 324. Namely, the expression (XB01_SB0_ID_MCH·XB01_SB1_ID_MCH) becomes true.

Figure 4:
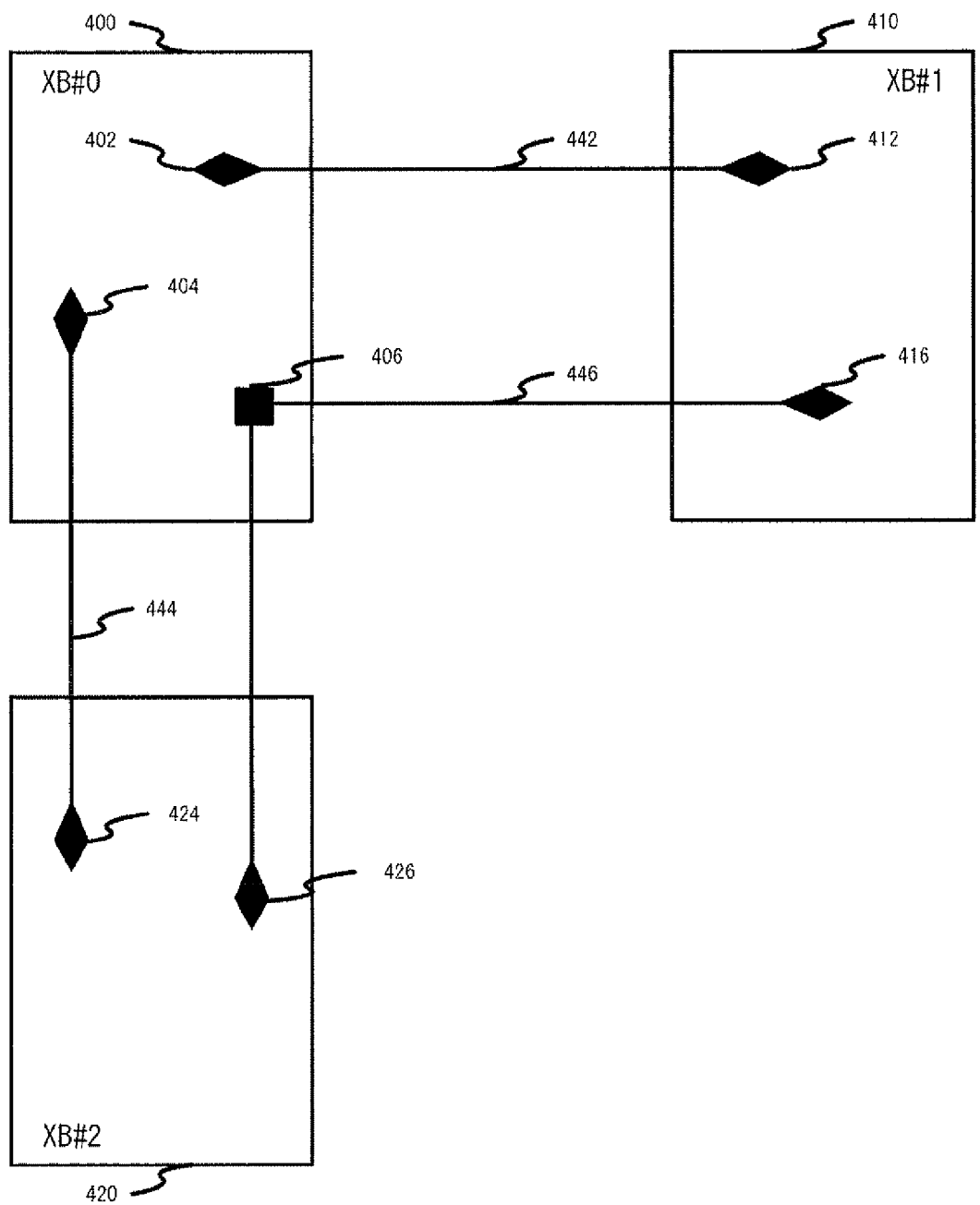
FIG. 4 is a conceptual diagram for explaining an example of a primary indirect conflict that the apparatus according to an embodiment of the present invention can detect.

FIG. 4 is a conceptual diagram for further explaining a primary indirect conflict, that is an indirect conflict via only one SB, as an example of the indirect conflict. FIG. 4 exemplifies three XB units such as XB#0 400, XB#1 410, and XB#2 420. Three SBs, SB#{0,0} 402, SB#{0,1} 404, and SB#{0,2} 406, are connected to XB#0 400. Additionally, two SBs, SB#{1,0} 412 and SB#{1,1} 416, are connected to XB#1 410, and two SBs, SB#{2,0} 424 and SB#{2,1} 426, are connected to XB#2 420. Here, SB#{0,0} 402 and SB#{1,0} 412 belong to the same partition PAR#A 442, SB#{0,1} 404 and SB#{2,0} 424 belong to the same partition PAR#B 444, and SB#{0,2} 406, SB#{1,1} 416, and SB#{2,1} 426 belong to the same partition PAR#C 446. Here, PAR#A 442, PAR#B 444, and PAR#C 446 are considered to be different partitions. Inter-XB-unit bus devices are omitted and not shown in FIG. 4.

In the configuration shown in FIG. 4, PAR#A 442 and PAR#B 444 do not make a direct conflict. However, PAR#A 442 and PAR#C 446 make a direct conflict, and also PAR#B 444 and PAR#C 446 make a direct conflict. Therefore, the broadcasting operation of PAR#C 446 makes a conflict with those of PAR#A 442 and PAR#B 444. PAR#A 442 and PAR#B 444 are therefore proved to make an indirect conflict via SB#{0,2} 406 belonging to XB#0 400 in this case. Namely, this is equivalent to the calculation such that ((XB01_SB0_ID_MCH·XB01_SB2_ID_MCH)·(XB02_SB1_ID_MCH·XB02_SB2_ID_MCH)) becomes true.

Figure 5:
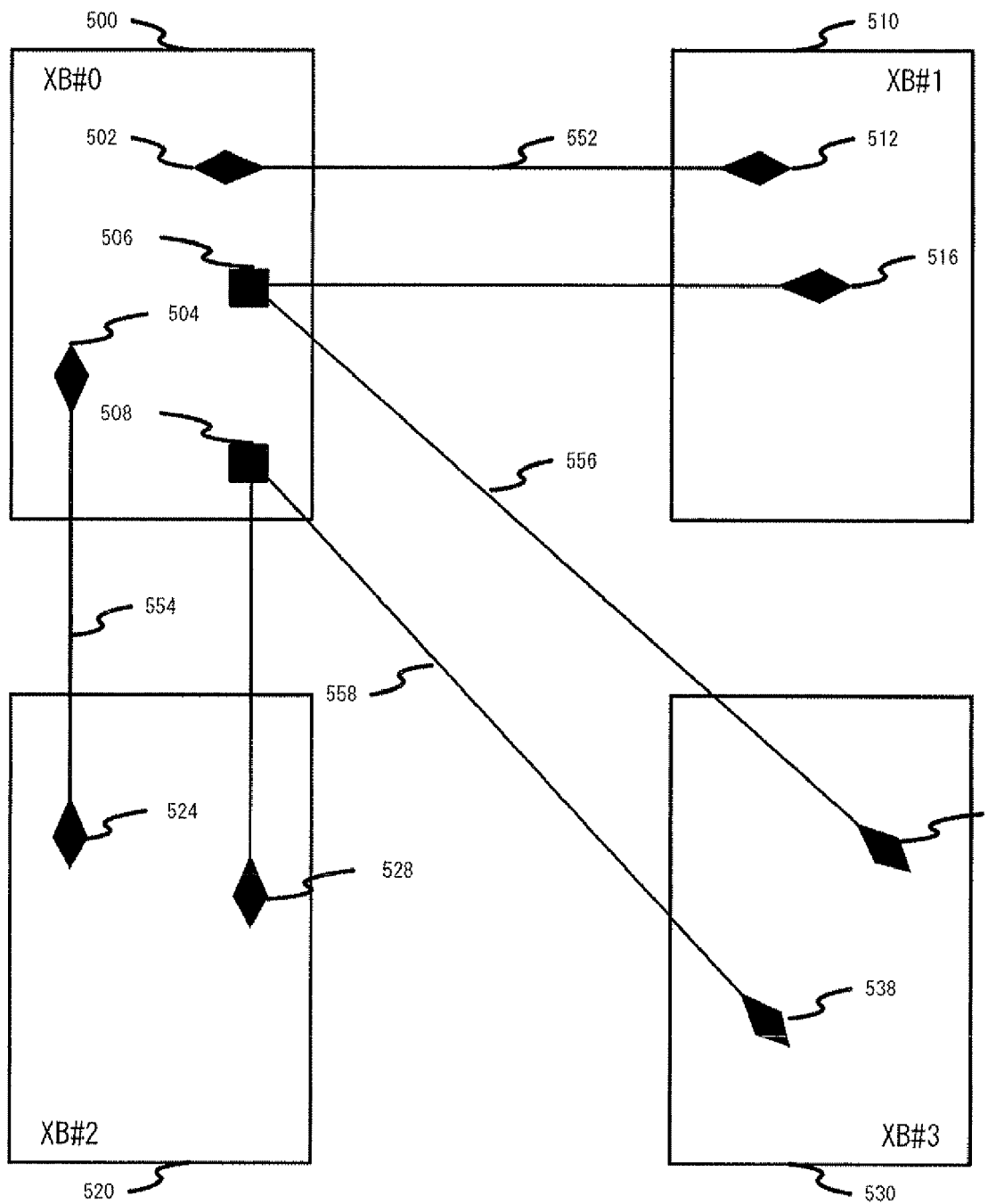
FIG. 5 is a conceptual diagram for explaining an example of a secondary indirect conflict that the apparatus according to an embodiment of the present invention can detect.

FIG. 5 is a conceptual diagram for further explaining a secondary indirect conflict, that is an indirect conflict via two SBs, as an example of the indirect conflict. FIG. 5 exemplifies four XB units such as XB#0 500, XB#1 510, XB#2 520, and XB#3 530. In FIG. 5, four SBs, SB#{0,0} 502, SB#{0,1} 504, SB#{0,2} 506, and SB#{0,3} 508, are connected to XB#0 500, and two SBs, SB#{1,0} 512 and SB#{1,1} 516, are connected to XB#1 510. Further, two SBs, SB#{2,0} 524 and SB#{2,1} 528 are connected to XB#2 520, and two SBs, SB#{3,0} 536 and SB#{3,1} 538 are connected to XB#3 530. Here, SB#{0,0} 502 and SB#{1,0} 512 belong to the same partition PAR#A 552, SB#{0,1} 504 and SB#{2,0} 524 belong to the same partition PAR#B 554, SB#{0,2} 506, SB#{1,1} 516, and SB#{3,0} 536 belong to the same partition PAR#C 556, and SB#{0,3} 508, SB#{2,1} 528, and SB#{3,1} 538 belong to the same partition PAR#D 558. PAR#A 552, PAR#B 554, PAR#C 556, and PAR#D 558 are considered to be different partitions here.

In the configuration shown in FIG. 5, PAR#A 552 and PAR#B 554 do not make a direct conflict. However, PAR#A 552 and PAR#C 556 make a direct conflict, PAR#C 556 and PAR#D 558 make a direct conflict, and PAR#D 558 and PAR#B 554 make a direct conflict. The broadcasting operations of PAR#C 556 and PAR#D 558 are therefore proved to make a conflict with those of PAR#A 552 and PAR#B 554. Accordingly, PAR#A 552 and PAR#B 554 are proved to make an indirect conflict via SB#{0,2} 506 and SB#{0,3} 508, which belong to XB#0 500. This is equivalent to the calculation such that ((XB01_SB0_ID_MCH·XB01_SB2_ID_MCH)·(XB03_SB2_ID_MCH·XB03_SB3_ID_MCH)·(XB02_SB1_ID_MCH·XB02_SB3_ID_MCH)) becomes true.

Table 2 summarizes some of the conflict determinations. For the sake of simplicity, SB#k that belongs to XB#0 is abbreviated to [k].

TABLE 2

| | |
|---|---|
| same partition | SB0_PRI_ENB [1] = XB00_SB01_ID_MCH |
| direct conflict | + (XB01_SB0_ID_MCH · XB01_SB1_ID_MCH |
| | + XB02_SB0_ID_MCH · XB02_SB1_ID_MCH |
| | + XB03_SB0_ID_MCH · XB03_SB1_ID_MCH) |
| indirect conflict via [2] | + (XB01_SB0_ID_MCH · XB01_SB2_ID_MCH |
| | + XB02_SB0_ID_MCH · XB02_SB2_ID_MCH |
| | + XB03_SB0_ID_MCH · XB03_SB2_ID_MCH) |
| | · (XB01_SB1_ID_MCH · XB01_SB2_ID_MCH |
| | + XB02_SB1_ID_MCH · XB02_SB2_ID_MCH |
| | + XB03_SB1_ID_MCH · XB03_SB2_ID_MCH) |
| indirect conflict via [3] | + (XB01_SB0_ID_MCH · XB01_SB3_ID_MCH |
| | + XB02_SB0_ID_MCH · XB02_SB3_ID_MCH |
| | + XB03_SB0_ID_MCH · XB03_SB3_ID_MCH) |
| | · (XB01_SB1_ID_MCH · XB01_SB3_ID_MCH |
| | + XB02_SB1_ID_MCH · XB02_SB3_ID_MCH |
| | + XB03_SB1_ID_MCH · XB03_SB3_ID_MCH) |
| indirect conflict via [2] and [3] | + (XB01_SB0_ID_MCH · XB01_SB2_ID_MCH |
| | + XB02_SB0_ID_MCH · XB02_SB2_ID_MCH |
| | + XB03_SB0_ID_MCH · XB03_SB2_ID_MCH) |
| | · (XB01_SB1_ID_MCH · XB01_SB3_ID_MCH |
| | + XB02_SB1_ID_MCH · XB02_SB3_ID_MCH |
| | + XB03_SB1_ID_MCH · XB03_SB3_ID_MCH) |
| | · (XB01_SB2_ID_MCH · XB01_SB3_ID_MCH |
| | + XB02_SB2_ID_MCH · XB02_SB3_ID_MCH |
| | + XB03_SB2_ID_MCH · XB03_SB3_ID_MCH) |
| | + (XB01_SB0_ID_MCH · XB01_SB3_ID_MCH |
| | + XB02_SB0_ID_MCH · XB02_SB3_ID_MCH |
| | + XB03_SB0_ID_MCH · XB03_SB3_ID_MCH) |
| | · (XB01_SB1_ID_MCH · XB01_SB2_ID_MCH |
| | + XB02_SB1_ID_MCH · XB02_SB2_ID_MCH |
| | + XB03_SB1_ID_MCH · XB03_SB2_ID_MCH) |
| | · (XB01_SB2_ID_MCH · XB01_SB3_ID_MCH |
| | + XB02_SB2_ID_MCH · XB02_SB3_ID_MCH |
| | + XB03_SB2_ID_MCH · XB03_SB3_ID_MCH) |

Table 2 exemplifies expressions for determining a conflict between SB#{0,0} and SB#{0,1}. Table 2 represents expressions in the case of the same partition, in the case of a direct conflict, and in the case of an indirect conflict associated with SB#{0,2} and SB#{0,3}. Here, SB0_PRI_ENB[1] is a variable that stores a value indicating a conflict with [1] when viewed from [0]. Additionally, an "indirect conflict via [2]" indicates an indirect conflict via SB#{0,2}, an "indirect conflict via [3]" indicates an indirect conflict via SB#{0,3}, and an "indirect conflict via [2] and [3]" indicates an indirect conflict via SB#{0,2} and SB#{0,3}. Here, the "indirect conflict via [2] and [3]" indicates the case where [0] and [2] make a direct conflict via any of XB#1 to XB#3, and [1] and [3] make a direct conflict via any of XB#1 to XB#3, and [2] and [3] make a direct conflict via any of XB#1 to XB#3, or the case where [0] and [3] make a direct conflict via any of XB#1 to XB#3, and [1] and [2] make a direct conflict via any of XB#1 to XB#3, and [2] and [3] make a direct conflict via any of XB#1 to XB#3.

Table 3 provided below shows an example of using a combination of [x,j,k,l] limited by values included in this table when viewed from XB#0. This combination of [x,j,k,l] exemplifies the case where four SBs are connected to XB#0.

TABLE 3

| | | | |
|---|---|---|---|
| same partition | SBx_PR1_ENB [j] = XB00_SBxj_ID_MCH | ← [x, j] = | [0, 0] [0, 1] [0, 2] [0, 3] |
| | | | [1, 0] [1, 1] [1, 2] [1, 3] |
| | | | [2, 0] [2, 1] [2, 2] [2, 3] |
| | | | [3, 0] [3, 1] [3, 2] [3, 3] |
| direct conflict | + (XB01_SBx_ID_MCH · XB01_SBj_ID_MCH | ←[x, j, k, l] = | [0, 1, 2, 3] [0, 1, 3, 2] [0, 2, 1, 3] |
| | | | [0, 2, 3, 1] [0, 3, 1, 2] [0, 3, 2, 1] |
| | + XB02_SBx_ID_MCH · XB02_SBj_ID_MCH | " | [1, 0, 2, 3] [1, 0, 3, 2] [1, 2, 0, 3] |
| | | | [1, 2, 3, 0] [1, 3, 0, 2] [1, 3, 2, 0] |

TABLE 3-continued

| | | | |
|---|---|---|---|
| | + XB03_SBx_ID_MCH · XB03_SBj_ID_MCH) | " | [2, 0, 1, 3] [2, 0, 3, 1] [2, 1, 0, 3] |
| | | | [2, 1, 3, 0] [2, 3, 0, 1] [2, 3, 1, 0] |
| | | | [3, 0, 1, 2] [3, 0, 2, 1] [3, 1, 0, 2] |
| | | | [3, 1, 2, 0] [3, 2, 0, 1] [3, 2, 1, 0] |
| indirect conflict via [2] | + (XB01_SBx_ID_MCH · XB01_SBk_ID_MCH | " | |
| | + XB02_SBx_ID_MCH · XB02_SBk_ID_MCH | " | |
| | + XB03_SBx_ID_MCH · XB03_SBk_ID_MCH) | " | |
| | · (XB01_SBj_ID_MCH · XB01_SBk_ID_MCH | " | |
| | + XB02_SBj_ID_MCH · XB02_SBk_ID_MCH | " | |
| | + XB03_SBj_ID_MCH · XB03_SBk_ID_MCH) | " | |
| indirect conflict via [3] | + (XB01_SBx_ID_MCH · XB01_SBl_ID_MCH | " | |
| | + XB02_SBx_ID_MCH · XB02_SBl_ID_MCH | " | |
| | + XB03_SBx_ID_MCH · XB03_SBl_ID_MCH) | " | |
| | · (XB01_SBj_ID_MCH · XB01_SBl_ID_MCH | " | |
| | + XB02_SBj_ID_MCH · XB02_SBl_ID_MCH | " | |
| | + XB03_SBj_ID_MCH · XB03_SBl_ID_MCH) | " | |
| indirect conflict via [2] and [3] | + (XB01_SBx_ID_MCH · XB01_SBk_ID_MCH | " | |
| | + XB02_SBx_ID_MCH · XB02_SBk_ID_MCH | " | |
| | + XB03_SBx_ID_MCH · XB03_SBk_ID_MCH) | " | |
| | · (XB01_SBj_ID_MCH · XB01_SBl_ID_MCH | " | |
| | + XB02_SBj_ID_MCH · XB02_SBl_ID_MCH | " | |
| | + XB03_SBj_ID_MCH · XB03_SBl_ID_MCH) | " | |
| | · (XB01_SBk_ID_MCH · XB01_SBl_ID_MCH | " | |
| | + XB02_SBk_ID_MCH · XB02_SBl_ID_MCH | " | |
| | + XB03_SBk_ID_MCH · XB03_SBl_ID_MCH) | " | |

Indirect conflicts that can be detect and determine by apparatuses or methods according to embodiments of the present invention may include indirect conflicts associated with a lot more XB units or SBs, in addition to the above described primary and secondary indirect conflicts.

First Embodiment

FIG. 6 is a schematic diagram showing an outline of a first embodiment according to the present invention. FIG. 6 shows an apparatus according to the first embodiment implemented in a system where three XB units to each of which three SBs are connected exist, and inter-XB-unit bus devices connect $_3C_2$ combinations of the XB units without repetitions. Here, assume that three XB units such as XB#0 600, XB#1 610, and XB#2 620 exist. In FIG. 6, SB#{0,0} 601, SB#{0,1} 602, and SB#{0,2} 603 are connected to XB#0 600. Similarly, SB#{1,0} 611, SB#{1,1} 612, and SB#{1,2} 613 are connected to XB#0 610, and SB#{2,0} 621, SB#{2,1} 622, and SB#{2,2} 623 are connected to XB#2 620. Furthermore, XB#0 600 and XB#1 610 are connected by BUS#{0_1} 640. Similarly, XB#0 600 and XB#2 620 are connected by BUS#{0_2} 641, and XB#0 610 and XB#2 620 are connected by BUS#{1_2} 642. Black solid arrows shown in FIG. 6 indicate the existences of the other SBs that make a conflict over the use of an inter-XB-unit bus device.

For the detection of a conflict in order to control the priorities of partitions in this system, the partition ID identifying unit identifies the partition ID of each of the SBs. Then, the partition ID match detecting unit obtains a value, true or false), to be stored in XBab_SBcd_ID_MCH (a and b are mutually independently 0, 1, or 2, and c and d are mutually independently 0, 1, or 2) for at least one combination of a, b, c, and d in accordance with Table 1 on the basis of the identification results of the partition ID identifying unit. The following description is provided by assuming that the partition ID match detecting unit detects matches between partition IDs for all of possible combinations.

Furthermore, by grouping the above obtained XBab_SBcd_ID_MCH by each d, and a value to be stored in each variable is determined by defining XBab_SBcd_ID_MCH to be true if at least one of the variables grouped by each d is true. In the first embodiment, the value is represented as 1 if the variable is true, or as 0 if it is false.

XB00_SB0_ID_MCH=1
XB01_SB0_ID_MCH=1
XB02_SB0_ID_MCH=0
XB00_SB1_ID_MCH=1
XB01_SB1_ID_MCH=1
XB02_SB1_ID_MCH=1
XB00_SB2_ID_MCH=1
XB01_SB2_ID_MCH=0
XB02_SB2_ID_MCH=1
XB10_SB0_ID_MCH=1
XB11_SB0_ID_MCH=1
XB12_SB0_ID_MCH=0
XB10_SB1_ID_MCH=1
XB11_SB1_ID_MCH=1
XB12_SB1_ID_MCH=0
XB10_SB2_ID_MCH=1
XB11_SB2_ID_MCH=1
XB12_SB2_ID_MCH=1
XB20_SB0_ID_MCH=1
XB21_SB0_ID_MCH=1
XB22_SB0_ID_MCH=1
XB20_SB1_ID_MCH=1
XB21_SB1_ID_MCH=0
XB22_SB1_ID_MCH=1
XB20_SB2_ID_MCH=1
XB21_SB2_ID_MCH=0
XB22_SB2_ID_MCH=1

An inter-two-crossbar-unit direct conflict partition detecting unit included by the inter-crossbar-unit conflict partition detecting unit detects a partition in a direct conflict by detecting a combination that makes a direct conflict from among combinations of two SBs connected to the same XB unit. Namely, it is determined whether or not (XBab_SBc_ID_MCH·XBab_SBd_ID_MCH) is true for each of the combinations of [a,b]. However, the case of c=d is excluded here because it is evident. Specifically, by way of example, for a combination of SB#{0,0} 601 and SB#{0,1} 602, ((XB01_SB0_ID_MCH·XB01_SB1_ID_MCH)+ (XB02_SB0_ID_MCH·XB02_SB1_ID_MCH))=1 is calculated. Accordingly, SB#{0,0} 601 and SB{0,1} 602 are determined to make a direct conflict. Also for the other combinations of the SBs, the determination of a direct conflict is similarly made.

As a result of determining a direct conflict for each combination with the above described technique, the combination of SB#{0,0} 601 and SB#{0,1} 602, and the combination of SB#{0,1} 602 and SB#{0,2} 603 are determined to make a direct conflict when viewed from XB#0 600. Since the partition ID identifying unit identifies the partitions to which these SBs respectively belong as described above, SB#{0,0} 601, SB#{0,1} 602, and SB#{0,2} 603 are identified as belonging to PAR#1, PAR#2, and PAR #3 respectively. Therefore, PAR#1 and PAR#2 are proved to be different partitions using the same inter-XB-unit bus device, and also PAR #2 and PAR#3 are detected to be different partitions using the same inter-XB-unit bus device.

Additionally, an inter-multi-crossbar-unit indirect conflict partition detecting unit included by the inter-crossbar-unit conflict partition detecting unit detects a partition in an indirect conflict by detecting a combination that makes an indirect conflict for each combination of three SBs or more connected to the same XB unit. To detect an indirect conflict, by way of example, for a combination of three SBs, it is determined for each of the above described combinations of [a,b] whether or not either of (XBab_SBc_ID_MCH·XBab_SBe_ID_MCH) is true, and whether or not either of (XBab_SBd_ID_MCH·XBab_SBe_ID_MCH) is true. Here, c and d are the above described numbers that are not equal, and e is a number chosen similar to the numbers c and d and is not equal to c and d. However, the case of c=d is excluded here because it is evident. Specifically, by way of example, for the combination of SB#{0,0} 601, SB#{0,1} 602, and SB#{0,2} 603, which belong to XB# 600, the determination is made by considering the case where SB#{0,0} 601 and SB#{0,2} 603 make an indirect conflict via SB#{0,1} 602. Namely, (((XB01_SB0_ID_MCH·XB01_SB1_ID_MCH)+ (XB02_SB0_ID_MCH·XB02_SB1_ID_MCH)+ (XB03_SB0_ID_MCH·XB03_SB1_ID_MCH))· ((XB01_SB2_ID_MCH·XB01_SB1_ID_MCH)+ (XB02_SB2_ID_MCH·XB02_SB1_ID_MCH)+ (XB03_SB2_ID_MCH·XB03_SB1_ID_MCH)))=1 is calculated. Accordingly, the combination of SB#{0,0} 601 and SB#{0,2} 603 is determined to make a primary indirect conflict.

Also the other combinations of the SBs can be determined in a similar manner.

Second Embodiment

FIG. 7 is a schematic diagram showing the outline of a second embodiment according to the present invention. FIG. 7 shows an apparatus according to the second embodiment implemented in a system where four XB units to each of which four SBs are connected exist, and inter-XB-unit bus devices connect $_4C_2$ combinations the XB units without repetitions.

Here, assume that the four XB units such as XB#0 700, XB#1 710, XB#2 720, and XB#3 730 exist. In FIG. 7, SB#{0,0} 701, SB#{0,1} 702, SB#{0,2} 703, and SB#{0,3} 704 are connected to XB#0 700. Similarly, SB#{1,0} 711, SB#{1,1} 712, SB#{1,2} 713, and SB#{1,3} 714 are connected to XB#1 710, SB#{2,0} 721, SB#{2,1} 722, SB#{2,2} 723, and SB#{2,3} 724 are connected to XB#2 720, and SB#{3,0} 731, SB#{3,1} 732, SB#{3,2} 733, and SB#{3,3} 734 are connected to XB#3 730. Furthermore, XB#0 700 and XB#1 710 are connected by BUS#{0_1} 750. Similarly, XB#0 700 and XB#2 720 are connected by BUS#{0_2} 751, XB#0 700 and XB#3 730 are connected by BUS#{0_3} 752, XB#1 710 and XB#2 720 are connected by BUS#{1_2} 753, XB#1 710 and XB#3 730 are connected by BUS#{1_3} 754, and XB#2 720 and XB#3 730 are connected by BUS#{2_3} 755. Black solid arrows shown in FIG. 7 indicate the existences of SBs that make a conflict over the use of an inter-XB-unit bus device.

For the detection of a conflict in order to control the priorities of partitions in this system, the partition ID identifying unit identifies the partition ID of each of the SBs. Then, the partition ID match detecting unit obtains a value (true or false) to be stored in XBab_SBcd_ID_MCH (a and b are mutually independently 0, 1, 2, or 3, and c and d are mutually independently 0, 1, 2, or 3) for at least one combination of a, b, c, and d in accordance with Table 1 on the basis of the identification results of the partition ID identifying unit. The following description is provided by assuming that the partition ID match detecting unit detects matches between partition IDs for all of possible combinations.

Furthermore, by grouping the above obtained XBab_SBcd_ID_MCH by each d, and by defining XBab_SBcd_ID_MCH to be true if at least one of the variables grouped by each d is true, a value to be stored in each variable is determined. In the second embodiment, the value is represented as 1 if the variable is true, or as 0 if it is false.

XB00_SB0_ID_MCH=1
XB01_SB0_ID_MCH=1
XB02_SB0_ID_MCH=0
XB03_SB0_ID_MCH=0
XB00_SB1_ID_MCH=1
XB01_SB1_ID_MCH=1
XB02_SB1_ID_MCH=0
XB03_SB1_ID_MCH=0
XB00_SB2_ID_MCH=1
XB01_SB2_ID_MCH=1
XB02_SB2_ID_MCH=1
XB03_SB2_ID_MCH=0
XB00_SB3_ID_MCH=1
XB01_SB3_ID_MCH=0
XB02_SB3_ID_MCH=1
XB03_SB3_ID_MCH=0
XB10_SB0_ID_MCH=1
XB11_SB0_ID_MCH=1
XB12_SB0_ID_MCH=0
XB13_SB0_ID_MCH=0
XB10_SB1_ID_MCH=1
XB11_SB1_ID_MCH=1
XB12_SB1_ID_MCH=0
XB13_SB1_ID_MCH=0
XB10_SB2_ID_MCH=1
XB11_SB2_ID_MCH=1
XB12_SB2_ID_MCH=1
XB13_SB2_ID_MCH=0
XB10_SB3_ID_MCH=1
XB11_SB3_ID_MCH=1
XB12_SB3_ID_MCH=1
XB13_SB3_ID_MCH=0
XB20_SB0_ID_MCH=1
XB21_SB0_ID_MCH=1
XB22_SB0_ID_MCH=1
XB23_SB0_ID_MCH=0
XB20_SB1_ID_MCH=1
XB21_SB1_ID_MCH=0
XB22_SB1_ID_MCH=1
XB23_SB1_ID_MCH=0
XB20_SB2_ID_MCH=0

XB21_SB2_ID_MCH=0
XB22_SB2_ID_MCH=1
XB23_SB2_ID_MCH=1
XB20_SB3_ID_MCH=0
XB21_SB3_ID_MCH=0
XB22_SB3_ID_MCH=1
XB23_SB3_ID_MCH=1
XB30_SB0_ID_MCH=0
XB31_SB0_ID_MCH=0
XB32_SB0_ID_MCH=1
XB33_SB0_ID_MCH=1
XB30_SB1_ID_MCH=0
XB31_SB1_ID_MCH=0
XB32_SB1_ID_MCH=1
XB33_SB1_ID_MCH=1
XB30_SB2_ID_MCH=0
XB31_SB2_ID_MCH=0
XB32_SB2_ID_MCH=0
XB33_SB2_ID_MCH=1
XB30_SB3_ID_MCH=0
XB31_SB3_ID_MCH=0
XB32_SB3_ID_MCH=0
XB33_SB3_ID_MCH=1

Upon receipt of the detection results, the inter-two-crossbar-unit direct conflict partition detecting unit included by the inter-crossbar-unit conflict partition detecting unit detects a partition in a direct conflict by detecting a combination that makes a direct conflict from among combinations of two SBs connected to the same XB unit. Namely, whether or not either of (XBab_SBc_ID_MCH·XBab_SBd_ID_MCH) is true is determined for each of the above described combinations of [a,b]. The case of c=d is excluded here because it is evident. Specifically, by way of example, for the combination of SB#{0,0} 701 and SB#{0,2} 703, ((XB01_SB0_ID_MCH·XB01_SB2_ID_MCH)+(XB02_SB0_ID_MCH·XB02_SB2_ID_MCH)+(XB03_SB0_ID_MCH·XB03_SB2_ID_MCH))=1 is calculated. Accordingly, SB#{0,0} 701 and SB{0,2} 703 are determined to make a direct conflict. Also for the other combinations of the SBs, the determination of a direct conflict is similarly made.

As a result of determining a direct conflict for each of the combinations with the above described technique, the combination of SB#{0,0} 701 and SB#{0,2} 703, and that of SB#{0,2} 703 and SB#{0,3} 704, except for the combination of SB#{0,0} 701 and SB#{0,1} 702, which belong to the same partition, are determined to make a direct conflict when viewed from XB#0 700. Since the partition ID identifying unit identifies the partitions to which the SBs respectively belong as described above, SB#{0,0} 701 and SB#{0,1} 702, SB#{0,2} 703, and SB#{0,3} 704 are identified as belonging to PAR#1, PAR#2, and PAR#3 respectively. PAR#1 and PAR#2 are therefore proved to be different partitions using the same inter-XB-unit bus device, and also PAR#2 and PAR#3 are detected to be different partitions using the same inter-XB-unit bus device.

Additionally, the inter-multi-crossbar-unit indirect conflict partition detecting unit included by the inter-crossbar-unit conflict partition detecting unit detects a partition in an indirect conflict by detecting a combination that makes an indirect conflict for each of combinations of three SBs or more connected to the same XB unit. To detect an indirect conflict, by way of example, for a combination of three SBs, it is determined for each of the above described combinations of [a,b] whether or not either of (XBab_SBc_ID_MCH·XBab_SBe_ID_MCH) is true, and whether or not either of (XBab_SBd_ID_MCH·XBab_SBe_ID_MCH) is true. Here, c and d are the above described numbers and are not equal, and e is a number chosen similar to the above described c and d and not equal to c and d. The case of c=d is excluded here because it is evident. Specifically, by way of example, for the combination of SB#{0,0} 701 and SB#{0,3} 704, the determination is made by considering the case where SB#{0,0} 701 and SB#{0,3} 704 make an indirect conflict via SB#{0,2} 703, and the case where SB#{0,0} 701 and SB#{0,3} 704 make an indirect conflict via SB#{0,1} 702. Namely, (((((XB01_SB0_ID_MCH·XB01_SB2_ID_MCH)+
(XB02_SB0_ID_MCH·XB02_SB2_ID_MCH)+
(XB03_SB0_ID_MCH·XB03_SB2_ID_MCH))·
((XB01_SB3_ID_MCH·XB01_SB2_ID_MCH)+
(XB02_SB3_ID_MCH·XB02_SB2_ID_MCH)+
(XB03_SB3_ID_MCH·XB03_SB2_ID_MCH)))+
(((XB01_SB0_ID_MCH·XB01_SB1_ID_MCH)+
(XB02_SB0_ID_MCH·XB02_SB1_ID_MCH)+
(XB03_SB0_ID_MCH·XB03_SB1_ID_MCH))·
((XB01_SB3_ID_MCH·XB01_SB1_ID_MCH)+
(XB02_SB3_ID_MCH·XB02_SB1_ID_MCH)+
(XB03_SB3_ID_MCH·XB03_SB1_ID_MCH))))=1 is calculated. Accordingly, the combination of SB#{0,0} 701 and SB#{0,3} 704 is determined to make a primary indirect conflict in this case. Also the other combinations of the three SBs can be determined in a similar manner.

Additionally, since the four XB units exist in the second embodiment, the inter-multi-crossbar-unit indirect conflict partition detecting unit can also detect a secondary indirect conflict for the combinations of the four SBs. In this case, by way of example, for the combination of SB#{0,0} 701, SB#{0,1} 702, SB#{0,2} 703, and SB#{0,3} 704, the inter-multi-crossbar-unit indirect conflict partition detecting unit detects the case where two of the four SBs make an indirect conflict via the remaining two SBs. As an example of the secondary indirect conflict between SB#{0,0} 701 and SB#{0,2} 703 via SB#{0,1} 702 and SB#{0,3} 704, (((((XB01_SB0_ID_MCH·XB01_SB1_ID_MCH)+
(XB02_SB0_ID_MCH·XB02_SB1_ID_MCH)+
(XB03_SB0_ID_MCH·XB03_SB1_ID_MCH))·
((XB01_SB1_ID_MCH·XB01_SB3_ID_MCH)+
(XB02_SB1_ID_MCH·XB02_SB3_ID_MCH)+
(XB03_SB1_ID_MCH·XB03_SB3_ID_MCH))·
((XB01_SB3_ID_MCH·XB01_SB2_ID_MCH)+
(XB02_SB3_ID_MCH·XB02_SB2_ID_MCH)+
(XB03_SB3_ID_MCH      XB03_SB2_ID_MCH)))+
(((XB01_SB0_ID_MCH·XB01_SB3_ID_MCH)+
(XB02_SB0_ID_MCH·XB02_SB3_ID_MCH)+
(XB03_SB0_ID_MCH·XB03_SB3_ID_MCH))·
((XB01_SB3_ID_MCH·XB01_SB1_ID_MCH)+
(XB02_SB3_ID_MCH·XB02_SB1_ID_MCH)+
(XB03_SB3_ID_MCH·XB03_SB1_ID_MCH))
((XB01_SB1_ID_MCH·XB01_SB2_ID_MCH)+
(XB02_SB1_ID_MCH·XB02_SB2_ID_MCH)+
(XB03_SB1_ID_MCH·XB03_SB2_ID_MCH))))=0 is calculated, and no secondary indirect conflict is determined to occur in this combination of the SBs.

Figure 8:
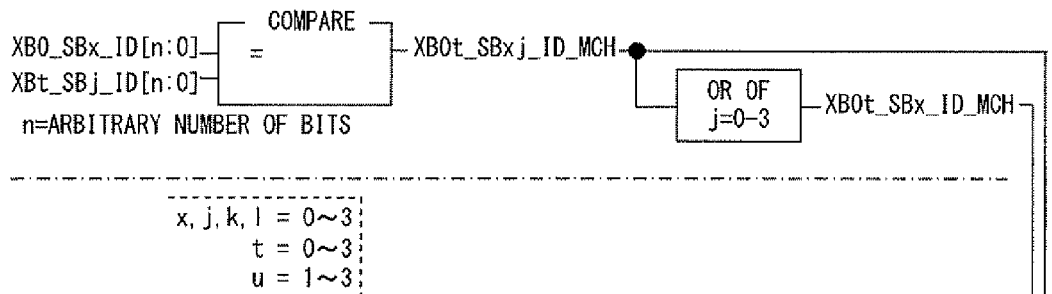
FIG. 8 is a schematic diagram for explaining the circuit in an apparatus according to the second embodiment of the present invention.
Figure 8:
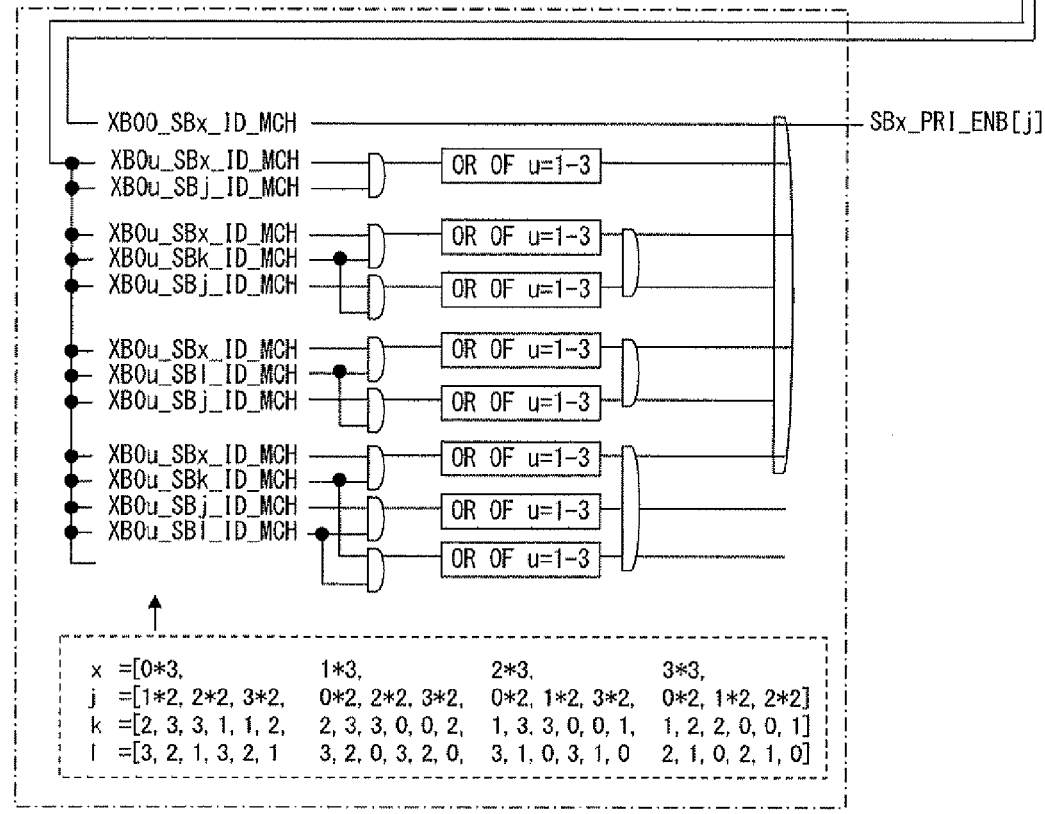

FIG. 8 is a circuit diagram for configuring the apparatus according to the second embodiment of the present invention. FIG. 8 depicts a circuit for executing the contents represented by Table 3. A person having ordinary skill in the art can correctly understand that a partition ID match controlling unit in FIG. 8 is one implementation of the partition ID match detecting unit, and a conflict partition determination controlling unit in FIG. 8 is one implementation of the inter-crossbar-unit conflict partition detecting unit.

Using the partition priority controlling apparatuses and the methods according to embodiments of the present invention can produce the effect of implementing a system where the use rate of inter-XB-unit bus devices can be improved, and system performance is not degraded to the extreme while saving the cost required for the inter-XB-unit bus devices.

What is claimed is:

1. A partition priority controlling apparatus for controlling priorities of a plurality of partitions using buses in a computer system, the computer system including a plurality of system board modules each of which can be grouped into any of the plurality of partitions, a plurality of crossbar units, and each bus interconnecting two of the plurality of crossbar units, each of the crossbar unit is connected to at least one of the plurality of system board modules, and the apparatus comprising:

a partition match detecting unit for detecting whether or not a partition to which one of the plurality of system board modules belongs matches partitions to which the other system board modules respectively belong; and an inter-crossbar-unit conflict partition detecting unit for detecting a combination of partitions, which make a conflict between the plurality of crossbar units, on the basis of a detection result of said partition match detecting unit; wherein said inter-crossbar-unit conflict partition detecting unit includes an inter-two-crossbar-unit conflict partition detecting unit for determining that a combination of two system board modules, which do not belong to a same partition, makes a conflict between each bus interconnecting two of the plurality of crossbar units;

said inter-crossbar-unit conflict partition detecting unit includes an inter-multi-crossbar-unit conflict partition detecting unit for determining whether first and third partitions make a conflict if the first partition and a second partition make a conflict between first and second crossbar units, and if the second and the third partitions make a conflict between first and third crossbar units, when three or more crossbar units exist in the computer system; and when a primary indirect conflict exists, that is an indirect conflict via only one system board module of the plurality of system board modules; or when a secondary indirect conflict exists, that is an indirect conflict via two system board modules of the plurality of system board modules;

indirect conflicts detected and determined by the partition priority controlling apparatus include indirect conflicts associated with the plurality of crossbar units or the plurality of system board modules in addition to the primary indirect conflicts and the secondary indirect conflicts.

2. A partition priority controlling apparatus for controlling priorities of a plurality of partitions using buses in a computer system, the computer system including a plurality of system board modules each of which can be grouped into the plurality of partitions, a plurality of crossbar units, and each bus interconnecting two of the plurality of crossbar units, each of the crossbar unit is connected to at least one of the plurality of system board modules, and the apparatus comprising:

a partition ID identifying unit for determining to which partition each of the plurality of system board modules belongs;

a partition ID match detecting unit, which is connected to said partition ID identifying unit, for detecting whether or not a partition to which one of the plurality of system board modules belongs matches partitions, to which the other system board modules respectively belong, for at least one combination of the plurality of system board modules on the basis of a determination result of said partition ID identifying unit; and an inter-crossbar-unit conflict partition detecting unit, which is connected to said partition ID match detecting unit, for detecting a combination of partitions causing a conflict between two of the plurality of crossbar units, for at least two crossbar units on the basis of the determination result of said partition ID identifying unit, and a detection result of said partition ID match detecting unit; wherein said inter-crossbar-unit conflict partition detecting unit includes an inter-two-crossbar-unit conflict partition detecting unit for determining that a combination of two system board modules, which do not belong to a same partition, makes a conflict between each bus interconnecting two of the plurality of crossbar units;

said inter-crossbar-unit conflict partition detecting unit includes an inter-multi-crossbar-unit conflict partition detecting unit for determining whether first and third partitions make a conflict if the first partition and a second partition make a conflict between first and second crossbar units, and if the second and the third partitions make a conflict between the first and third crossbar units, when three or more crossbar units exist in the computer system; and when a primary indirect conflict exists, that is an indirect conflict via only one system board module of the plurality of system board modules; or when a secondary indirect conflict exists, that is an indirect conflict via two system board modules of the plurality of system board modules;

indirect conflicts detected and determined by the partition priority controlling apparatus include indirect conflicts associated with the plurality of crossbar units or the plurality of system board modules in addition to the primary indirect conflicts and the secondary indirect conflicts.

3. The partition priority controlling apparatus according to claim 2, wherein said inter-crossbar-unit conflict partition detecting unit includes an inter-two-crossbar-unit direct conflict partition detecting unit, and the inter-two-crossbar-unit direct conflict partition detecting unit determines that when a first crossbar unit to which one or more of the plurality of system board modules are connected exists among the plurality of crossbar units, a combination of two system board modules, which are determined not to belong to a same partition on the basis of the determination result of said partition ID identifying unit, causes a direct conflict under the condition that:

each of the two system board modules belongs to a partition of a system board module connected to a second crossbar unit different from the first crossbar unit, for at least one combination of the two system board modules among the system board modules connected to the first crossbar unit.

4. The partition priority controlling apparatus according to claim 3, wherein said inter-crossbar-unit conflict partition detecting unit includes an inter-multi-crossbar-unit indirect conflict partition detecting unit, and the inter-multi-crossbar-unit indirect conflict partition detecting unit determines that when a third crossbar unit to which three or more system board modules are connected exists among the plurality of crossbar units, a combination of three or more system board modules of the plurality of system board modules, which are determined not to belong to the same partition on the basis of the determination result of the partition ID identifying unit, causes an indirect conflict under the condition that:

the inter-two-crossbar-unit direct conflict partition detecting unit determines that one of two system board modules among the three or more system board modules causes a direct conflict with the other of the two system board modules via a fourth crossbar unit for at least one combination of the at least three system board modules, and the inter-two-crossbar-unit direct conflict partition detecting unit determines that at least one of the two system board modules among the at least three system board modules causes a direct conflict with any of the at least three system board modules except for the two system board modules via a fifth crossbar unit different from the fourth crossbar unit for at least one combination of the at least three system board modules.

5. The partition priority controlling apparatus according to claim 2, wherein a number of crossbar unit included in the computer system is four.

6. A partition priority controlling apparatus for controlling priorities of partitions using buses in a computer system, wherein:

the computer system that includes n system board modules each of which can be grouped into p partitions, m crossbar units, and each bus interconnecting at least two of the m crossbar units, and f(k) system board modules respectively referred to as SB#{k,0}, SB#{k,1}, . . ., SB#{k,f(k)} are connected to each XB#k of the m crossbar units respectively referred to as XB#0, XB#1, . . ., XB#m-1, and the apparatus comprising:

a partition ID identifying unit for determining to which partition each of the n system board modules belongs;

a partition ID match detecting unit for detecting whether or not a partition to which one of the n system board modules belongs matches partitions, to which the other system board modules respectively belong, on the basis of a determination result of said partition ID identifying unit; and an inter-crossbar-unit conflict partition detecting unit for detecting a combination of partitions, which make a conflict between XB#i and XB#j, on the basis of the determination result of said partition ID identifying unit, and a detection result of said partition ID match detecting unit; wherein m and n are mutually independent integers that are equal to or larger than 2, and p is a natural number;

k is an arbitrary integer that is equal to or larger than 0 and equal to or smaller than m-1, and $$\sum_{k=0}^{m-1} f(k) = n;$$

i and j are mutually independent arbitrary integers that are equal to or larger than 0 and equal to or smaller than m-1;

said inter-crossbar-unit conflict partition detecting unit includes an inter-two-crossbar-unit direct conflict partition detecting unit for determining that a combination of two system board modules, which do not belong to a same partition, makes a conflict between each bus interconnecting two of the plurality of crossbar units;

said inter-crossbar-unit conflict partition detecting unit includes an inter-multi-crossbar-unit conflict partition detecting unit for determining whether first and third partitions make a conflict if the first partition and a second partition make a conflict between first and second crossbar units, and if the second and the third partitions make a conflict between first and third crossbar units, when three or more crossbar units exist in the computer system; and when a primary indirect conflict exists, that is an indirect conflict via only one system board module of the plurality of system board modules; or when a secondary indirect conflict exists, that is an indirect conflict via two system board modules of the plurality of system board modules;

indirect conflicts detected and determined by the partition priority controlling apparatus include indirect conflicts associated with the plurality of crossbar units or the plurality of system board modules in addition to the primary indirect conflicts and the secondary indirect conflicts.

7. The partition priority controlling apparatus according to claim 6, wherein said inter-crossbar-unit conflict partition detecting unit includes an inter-two-crossbar-unit direct conflict partition detecting unit for determining that a combination of system board modules SB#{i,x} and SB#{i,y} makes a direct conflict via a crossbar unit XB#a, if SB#{i,x} or SB#{i,y} belongs to a partition of a system board module connected to the crossbar unit XB#a other than XB#i, for at least one combination of SB#{i,x} and SB#{i,y}, when SB#{i,x} and SB#{i,y} among f(i) system board modules connected to XB#i among the m crossbar units do not belong to the same partition on the basis of the determination result of the partition ID identifying unit; wherein x and y are mutually independent integers that are equal to or larger than 0 and equal to or smaller than f(i); and a is an arbitrary integer that is not equal to i, and equal to or larger than 0 and equal to or smaller than m-1.

8. The partition priority controlling apparatus according to claim 7, wherein said inter-crossbar-unit conflict partition detecting unit includes an inter-multi-crossbar-unit indirect conflict partition detecting unit for determining that a combination of at least three system board modules SB#{i,x}, SB#{i,y}, SB#{i,z},. . . among f(i) system board modules connected to XB#i among the m crossbar units makes an indirect conflict via XB#i and XB#a, and XB#i and XB#b, if said inter-two-crossbar-unit direct conflict partition detecting unit determines that any of the system board modules other than SB#{i,x} and SB#{i,y} in the combination of the system board modules SB#{i,x}, SB#{i,y}, SB#{i,z},. . . makes a direct conflict via a crossbar unit XB#b different from XB#i or XB#a among the m crossbar units, when the inter-two-crossbar-unit direct conflict partition detecting unit determines that SB#{i,x} and SB#{i,y} make a direct conflict via XB#a in the combination of the at least three system board modules SB#{i,x}, SB#{i,y}, SB#{i,z}, . . ., wherein x, y, and z are mutually independent integers that are equal to or larger than 0 and equal to or smaller than f(i) that is equal to or larger than 3; and b is an arbitrary integer that is not equal to i, and equal to or larger than 0 and equal to or smaller than m-1.

9. A method for controlling priorities of a plurality of partitions using buses in a computer system, the computer system including a plurality of system board modules each of which can be grouped into the plurality of partitions, a plurality of crossbar units, and each bus interconnecting two of the plurality of crossbar units, each of the crossbar unit is connected to at least one of the plurality of system board modules, the method comprising:

a partition match detecting step of detecting whether or not a partition to which one of the plurality of system board modules belongs matches partitions to which the other system board modules respectively belong; and an inter-crossbar-unit conflict partition detecting step of detecting a combination of partitions, which make a conflict between the plurality of crossbar-units, on the basis of a detection result of said partition match detecting step; wherein said inter-crossbar-unit conflict partition detecting step includes an inter-two-crossbar-unit conflict partition detecting step of determining that a combination of two system board modules, which do not belong to a same partition, makes a conflict between each bus interconnecting two of the plurality of crossbar units;

said inter-crossbar-unit conflict partition detecting step includes an inter-multi-crossbar-unit conflict partition detecting step of determining whether first and third partitions make a conflict if the first partition and a second partition make a conflict between first and second crossbar units, and if the second and the third partitions make a conflict between first and third crossbar units, when three or more crossbar units exist in the computer system; and when a primary indirect conflict exists, that is an indirect conflict via only one system board module of the plurality of system board modules; or when a secondary indirect conflict exists, that is an indirect conflict via two system board modules of the plurality of system board modules;

indirect conflicts detected and determined by the partition priority controlling apparatus include indirect conflicts associated with the plurality of crossbar units or the plurality of system board modules in addition to the primary indirect conflicts and the secondary indirect conflicts.

10. An information processing device, comprising:

a plurality of modules;

a plurality of crossbar units, to each of which at least one of said plurality of modules is connected, and which are interconnected via buses;

an identifying unit for identifying a correspondence between a first partition to which a first module among said plurality of modules, which is connected to a first crossbar unit among said plurality of crossbar units, belongs, and a second partition to which a second module among said plurality of modules, which is connected to a second crossbar unit among said plurality of crossbar units, belongs; and a detecting unit for detecting a combination of partitions, which make a conflict between said plurality of crossbar units, depending on whether the first partition to which the first module belongs does not match the second partition to which the second module belongs; wherein said detecting unit includes an inter-two-crossbar-unit conflict partition detecting unit for determining that a combination of two system board modules, which do not belong to a same partition, makes a conflict between each bus interconnecting two of the plurality of crossbar units;

said detecting unit includes an inter-multi-crossbar-unit conflict partition detecting unit for determining whether first and third partitions make a conflict if the first partition and a second partition make a conflict between first and second crossbar units, and if the second and the third partitions make a conflict between first and third crossbar units, when three or more crossbar units exist in the computer system; and when a primary indirect conflict exists, that is an indirect conflict via only one system board module of the plurality of system board modules; or when a secondary indirect conflict exists, that is an indirect conflict via two system board modules of the plurality of system board modules;

indirect conflicts detected and determined by the partition priority controlling apparatus include indirect conflicts associated with the plurality of crossbar units or the plurality of system board modules in addition to the primary indirect conflicts and the secondary indirect conflicts.

* * * * *

UNITED STATES PATENT AND TRADEMARK OFFICE
CERTIFICATE OF CORRECTION

PATENT NO. : 7,752,378 B2
APPLICATION NO. : 12/200247
DATED : July 6, 2010
INVENTOR(S) : Hiromi Fukumura et al.

It is certified that error appears in the above-identified patent and that said Letters Patent is hereby corrected as shown below:

First Page Col. 2 (Other Publications), Line 1 Delete "Capabilty" and insert -- Capability --, therefor.

Signed and Sealed this

Thirtieth Day of November, 2010

David J. Kappos
*Director of the United States Patent and Trademark Office*